Patented Oct. 3, 1950

2,524,136

UNITED STATES PATENT OFFICE 2,524,136

PREPARATION OF MALEIMIDE AND N-SUBSTITUTED DERIVATIVES

Erhard J. Prill, Cresskill, N. J., assignor to United States Rubber Company, New York, N. Y., a corporation of New Jersey No Drawing. Application December 30, 1948, Serial No. 68,391

3 Claims. (Cl. 260—313)

My invention is concerned with the preparation of maleimide and certain N-substituted derivatives thereof, in a novel manner.

More particularly, my invention relates to the preparation of said chamicals by the pyrolytic decomposition, in the presence of a dienophile, of derivatives of delta-4-tetrahydrophthalimide in which the carbon atoms of the 3 and 6 positions are connected through one of the class consisting of an alkylene group, a 9,10-anthrylene group, and an oxygen atom. These various latter members are grouped together for the reason that they each, where present in the starting material, do not interfere with the formation of the maleimide or N-substituted derivative, on the thermal decomposition of the starting material.

By a dienophile is meant an olefinic compound such as maleic anhydride which is capable of forming a 1:1 molecular addition product with a conjugated diene hydrocarbon. The presence of such a maleic anhydride in the reaction zone not only promotes a smoother reaction but it likewise insures a uniformly high yield of the desired maleimide. Moreover, I have found that the conjugated cycloalkadiene which is ordinarily formed as a by-product in the pyrolysis reacts with the maleic anhydride present to form the corresponding delta-4-tetrahydrophthalic anhydride. The reaction of my invention can be illustrated as follows:

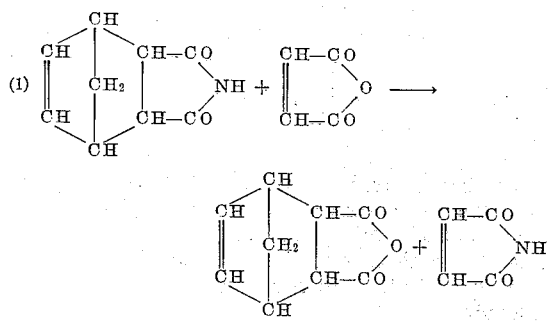

In this way, polymerization and other deleterious side-reactions of the conjugated diene by-product are substantially eliminated. Moreover, the troublesome condensation of the volatile diene by-product at low operating pressures is substantially eliminated since the maleic anhydride adduct thereof obtained in my process is readily recovered. The latter can then be recycled for the preparation of more of the corresponding delta-4-tetrahydrophthalimide derivative starting material through reaction of the adduct with ammonia or the appropriate amine.

My improvement can be applied to the pyrolytic decomposition of one of the class consisting of a 3,6-endo-alkylene-delta-4-tetrahydrophthalimide, a 3,6-endo(9,10-anthrylene)-delta-4-tetrahydrophthalimide and a 3,6-epoxy-delta-4-tetrahydrophthalimide, said compounds having the formula:

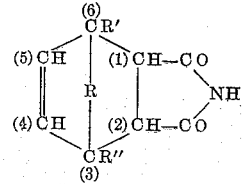

where R is an oxygen atom, an alkylene group such as methylene, ethylidene and trimethylene, or the 9,10-anthrylene group, and R' and R" are hydrogen or alkyl, e. g., methyl and ethyl. Such starting materials are available from the reaction of the appropriate cyclic conjugated diene with maleic anhydride and treatment of the product with ammonia, ammonium hydroxide or an ammonium salt, e. g., ammonium carbonate, to secure conversion of the anhydride to the corresponding imide (Jour. Org. Chem. 10, 149–58 (1945)).

The reaction of my invention is carried out by heating the delta-4-tetrahydrophthalimide derivative at temperatures above its melting point, particularly in the range of 200–500° C., and in the presence of an excess of maleic anhydride. A preferred method is to pass a mixture of the vaporized delta-4-tetrahydrophthalimide compound and the maleic anhydride in molar ratios of from 1:2 to 1:8, in the presence or absence of an inert diluent, e. g., nitrogen, through a heated reaction tube of glass, iron, steel, nickel, etc., which may be packed with an inert, fragmented material such as beads or chips of quartz and glass to increase the surface area of contact within the reaction vessel. The rate at which the delta-4-tetrahydrophthalimide derivative is passed trough the tube will vary somewhat with the particular starting material employed, the shape and relative dimensions of the reaction vessel, the temperature, and the pressure which is ordinarily in the range of about 1 to 760 mm. However, contact times, calculated on the volume of free space in the reaction tubes, of from 0.05 to 50.0 second and preferably from 0.05 to 10.0 seconds have proven satisfactory in my invention. Longer contact times may be used but at the risk of promoting decomposition and/or polymerization of the reaction products, particularly at the higher temperatures and pressures in the ranges cited above.

I have found that under the above specified conditions, the delta-4-tetrahydrophthalimide derivative reacts almost exclusively to form maleimide and the delta-4-tetrahydrophthalic anhydride compound which can be collected at the exit of the reaction tube, together with unreacted starting material, if any. The latter can be recovered and recycled for further use, as can the cyclic conjugated diene which can be reconverted to the delta-4-tetrahydrophthalimide derivative in the manner previously indicated, thus adding to the economy of my process.

Although the foregoing description of my invention has been concerned primarily with the synthesis of maleimide, my method is equally applicable to the preparation of N-substituted maleimides from the N-substituted-delta-4-tetrahydrophthalimide derivatives of the type formula:

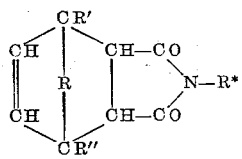

where R is an oxygen atom, the alkylene group such as methylene, ethylidene and trimethylene, or the 9,10-anthrylene group, and R' and R'' are hydrogen or alkyl, e. g., methyl and ethyl and R* may be hydrogen, alkyl (e. g., methyl, ethyl, propyl, isopropyl, n-butyl, isobutyl, amyl, hexyl, cyclohexyl, heptyl, octyl, nonyl, decyl, undecyl, dodecyl and stearyl), alkenyl (e. g., allyl, methallyl, crotyl, 4-pentenyl and 10-undecylenyl), and aryl (e. g., phenyl, tolyl, xylyl, xenyl and 2-naphthyl). Such materials are readily available from the reaction of the appropriate cyclic conjugated diene with maleic anhydride and treatment of the product with ammonia, ammonium hydroxide or an ammonium salt, e. g., ammonium carbonate, or the corresponding amines to secure conversion of the anhydride to the corresponding imide.

The following example discloses my invention in more detail. All parts are by weight.

*Example*

A mixture of 78 parts of 3,6-endomethylene-delta-4-tetrahydrophthalimide (Jour. Am. Chem. Soc. 66, 404–7 (1944)) and 187 parts of maleic anhydride is vaporized by passing through a 37.5-cm. length of 3-cm. heat-resistant glass tubing which is packed with quartz chips and heated at 260–270° C. The vapors are then passed through a 90-cm. length of 3-cm. heat-resistant glass tubing packed with quartz chips and maintained at 400° C. and 14–16 mm. pressure during a period of 2 hours. The effluent vapors are condensed at the exit and fractionally distilled to yield 23.2 parts of pure maleimide together with a further amount of maleimide contaminated with maleic anhydride which can be purified by redistillation.

3,6 - epoxy - delta-4-tetrahydrophthalimide (M. P. 153.5–154° C.) which is preparable by the reaction of 3,6-epoxy-delta-4-tetrahydrophthalic anhydride with ammonium hydroxide and fusion of the resulting ammonium salt, can be similarly treated.

The same procedure as in the example can also be applied to 3,6-endo-(9,10-anthrylene)-delta-4-tetrahydrophthalimide (M. P. 304–305° C.) which can be prepared by the reaction of 3,6-endo - (9,10 - anthrylene)-delta-4-tetrahydrophthalic anhydride with ammonium hydroxide and fusion of the resulting ammonium salt.

Both N - ethyl - 3,6-endomethylene-delta-4-tetrahydrophthalimide (M. P. 78–79° C.) and N-allyl - 3,6 - endomethylene-delta-4-tetrahydrophthalimide (M. P. 58–59° C.), can also be converted by a similar procedure. The former chemical can be prepared by treating 3,6-endomethylene-delta-4-tetrahydrophthalic anhydride in benzene, with an excess of ethylamine and refluxing until the mixture is removed by distillation and the residual solid may be decolored with charcoal and recrystallized with ethanol to yield the starting chemical.

The N-allyl-3,6-endomethylene-delta-4-tetrahydrophthalimide can be prepared from allylamine and 3,6-endomethylene-delta-4-tetrahydrophthalic anhydride by the same procedure mentioned for the preparation of 3,6-epoxy-delta-4-tetrahydrophthalimide.

Having thus described my invention, what I claim and desire to protect by Letters Patent is:

1. A method of making maleimide and N-substituted derivatives thereof which comprises thermally decomposing a compound of the formula

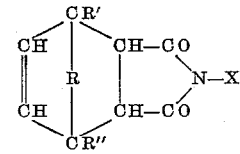

where X is from the class consisting of hydrogen and alkyl; R is a bridge from the class consisting of an oxygen atom, an alkylene group, and the 9,10-anthrylene group; R' and R'' represent a radical from the class consisting of hydrogen and alkyl, in the presence of maleic anhydride.

2. A method of making maleimide and N-substituted derivatives thereof which comprises thermally decomposing a compound of the formula

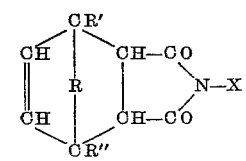

where X is hydrogen; R is a bridge from the class consisting of an oxygen atom, an alkylene group, and the 9,10-anthrylene group; R' and R'' represent a radical from the class consisting of hydrogen and alkyl, in the presence of maleic anhydride.

3. A method of making maleimide and N-substituted derivatives thereof which comprises heating the compound of the formula

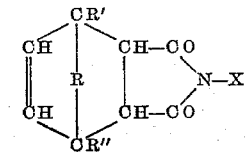

where X is from the class consisting of hydrogen and alkyl; R is a bridge from the class consisting of an oxygen atom, an alkylene group, and the 9,10-anthrylene group; R' and R'' represent a radical from the class consisting of hydrogen and alkyl, in the presence of maleic anhydride at a temperature in the range of 200°–500° C. and thereafter recovering the desired chemical.

ERHARD J. PRILL.

REFERENCES CITED

The following references are of record in the file of this patent:

UNITED STATES PATENTS

| Number | Name | Date |
|---|---|---|
| 2,391,226 | Clifford | Dec. 18, 1945 |
| 2,393,999 | McCrone | Feb. 5, 1946 |
| 2,405,559 | Bousquet | Aug. 13, 1946 |
| 2,406,657 | Bitler | Aug. 27, 1946 |